(12) United States Patent
Heeman et al.

(10) Patent No.: US 12,202,641 B2
(45) Date of Patent: Jan. 21, 2025

(54) APPARATUS FOR ATTACHING A SHRINKABLE LABEL ON A PRODUCT AND METHOD FOR ATTACHING A SHRINKABLE LABEL ON A PRODUCT

(71) Applicant: Fuji Seal International, Inc., Osaka (JP)

(72) Inventors: Frederik Gerardus Heeman, Deurne (NL); Marinus Antonius Leonarda Van Heck, Deurne (NL); Christoph Hollenbeck, Mönchengladbach (DE); Patrick Kirchner, Aachen (DE); Stephan Jansen, Geilenkirchen (DE); Klaus Baltes, Bergheim (DE)

(73) Assignee: Fuji Seal International, Inc., Osaka (JP)

( * ) Notice: Subject to any disclaimer, the term of this patent is extended or adjusted under 35 U.S.C. 154(b) by 78 days.

(21) Appl. No.: 18/007,906

(22) PCT Filed: May 4, 2021

(86) PCT No.: PCT/IB2021/053703
§ 371 (c)(1),
(2) Date: Dec. 2, 2022

(87) PCT Pub. No.: WO2021/250476
PCT Pub. Date: Dec. 16, 2021

(65) Prior Publication Data
US 2023/0227197 A1 Jul. 20, 2023

(30) Foreign Application Priority Data
Jun. 8, 2020 (LU) ........................................ 101843

(51) Int. Cl.
*B65C 9/02* (2006.01)
*B29C 63/42* (2006.01)
(Continued)

(52) U.S. Cl.
CPC ................ *B65C 9/02* (2013.01); *B29C 63/42* (2013.01); *B29C 65/1406* (2013.01); *B29C 65/66* (2013.01); *B65B 53/02* (2013.01)

(58) Field of Classification Search
CPC ....... B65C 9/02; B65C 63/42; B65C 65/1406; B65B 53/02
See application file for complete search history.

(56) References Cited

U.S. PATENT DOCUMENTS

2019/0256236 A1    8/2019  Nao et al.

FOREIGN PATENT DOCUMENTS

FR           2758387 A1 *  7/1998  ............ B65B 53/02
JP         2019-123512 A    7/2019
(Continued)

OTHER PUBLICATIONS

Search Report dated Feb. 26, 2021, issued for Luxembourg application No. LU101843.

*Primary Examiner* — Daniel McNally
(74) *Attorney, Agent, or Firm* — Locke Lord LLP; James E. Armstrong, IV (57) ABSTRACT

An apparatus for attaching a shrinkable label on a product placed on a conveyor, by irradiating light onto the shrinkable label, comprises two sets of light emitters which are arranged opposite each other on both sides of the conveyor along a defined length of the conveyor to form an irradiation volume through which the conveyor passes. The light emitters are configured to emit directed light bundles into the irradiation volume in different directions. In a plan view of the apparatus, the directions of the light bundles intersect with a longitudinal central axis of the conveyor. The intersection points of the directions of the light bundles emitted (Continued)

from the light emitters on a same side of the conveyor with the longitudinal central axis of the conveyor differ from each other.

18 Claims, 5 Drawing Sheets

(51) Int. Cl.
*B29C 65/14* (2006.01)
*B29C 65/66* (2006.01)
*B65B 53/02* (2006.01)

(56) References Cited

FOREIGN PATENT DOCUMENTS

| WO | 98/31590 A1 | 7/1998 |
| WO | 2017/213506 A1 | 12/2017 |

\* cited by examiner

APPARATUS FOR ATTACHING A SHRINKABLE LABEL ON A PRODUCT AND METHOD FOR ATTACHING A SHRINKABLE LABEL ON A PRODUCT

TECHNICAL FIELD

The present invention relates to an apparatus for attaching a shrinkable label on a product and a method for attaching a shrinkable label on a product.

BACKGROUND ART

Apparatuses for attaching shrinkable labels, such as shrink sleeve foils, on products, such as containers (food containers, bottles, jars, bowls, holders etc.), are well known in the art. Those shrink sleeve foils are made of heat-shrinkable material that is caused to shrink when its temperature is increased and thereby getting firmly attached to the product. UV light sources may be used to increase the temperature of the shrink sleeve foils and thereby activate the shrinking of the foil comprising heat shrinkable material.

WO 2017/213506 A1 discloses an apparatus for attaching a sleeve-like label comprising heat shrinkable material and photothermic material on a product. UV light is used to generate heat inside of the label because the label material or ink or varnish included in the label material is able to absorb the UV light and convert the absorbed UV light into thermal energy. As a result, the label material is heated up which causes the label to shrink and to form a close fit to the shape of the product around which the sleeve-like label has been arranged. In order to obtain good shrink results, a specific UV light peak wavelength between 200 and 399 nm is used, wherein at least 90% of the UV light is within a bandwidth of +/−60 nm of the peak wavelength. By making use of a plurality of UV light emitters arranged to define an irradiation volume wherein the products are transported on a conveyor, a relatively low cost and/or compact arrangement can be achieved for a fast and reliable attachment of the labels to the products. In order to realize an even distribution of light intensity over the label and to improve the uniformity of the illumination of the product, in the embodiment shown in FIG. 6 of WO 2017/213506 A1, the light emitters are directed so as to focus the emitted light on the product being transported on the conveyor at the center of the apparatus.

SUMMARY OF THE INVENTION

It is very important that the sleeve material is exposed by light beams in such a way that a homogenous temperature profile can be achieved. In order to achieve such a homogenous temperature profile, light beams emitted by the light emitters need to impinge the sleeve surface in an almost perpendicular direction while the sleeve being arranged on the product is conveyed with the product through the irradiation volume.

Figure 6:
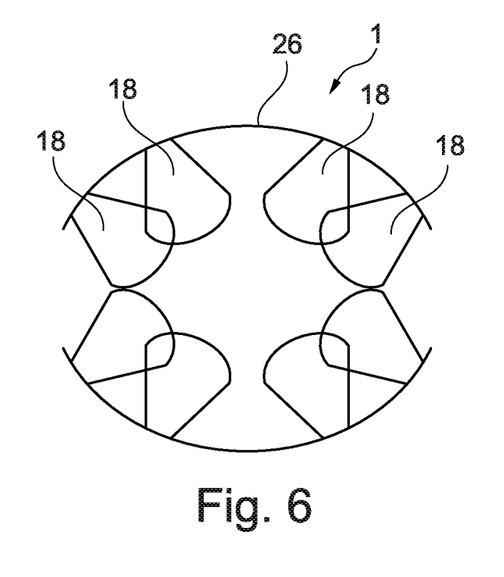
FIG. 6 shows a plan view of the apparatus of FIG. 5.
Figure 7:
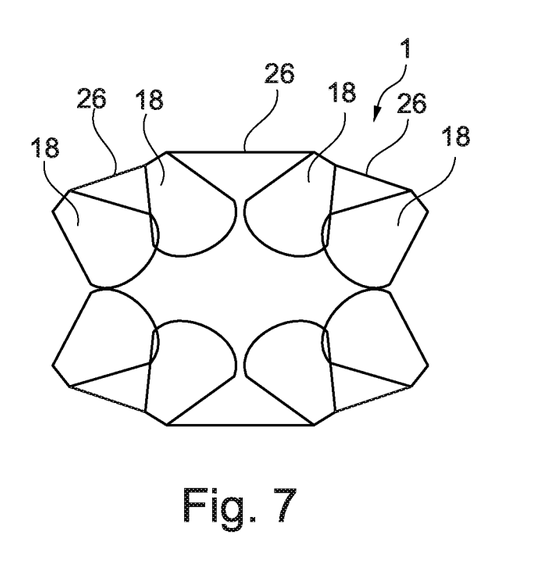
FIG. 7 shows a plan view of an apparatus according to the invention.

Starting from the apparatus disclosed in FIG. 6 of WO 2017/213506 A1, it is an object of the invention to provide an apparatus and a method for attaching a sleeve-like shrinkable label on a product that achieves a uniform shrinking effect of the label on the product. The object is achieved by the subject-matter of the independent claims. Advantageous further developments are laid out in the dependent claims.

According to the present invention, an apparatus for attaching a sleeve-like shrinkable label on a product placed on a conveyor, by irradiating light onto the shrinkable label is provided. The apparatus comprises two sets of light emitters which are arranged opposite each other on both sides of the conveyor along a defined length of the conveyor to form an irradiation volume through which the conveyor passes. The light emitters are configured to emit directed light bundles into the irradiation volume in different directions, wherein in a plan view of the apparatus, the directions of the light bundles intersect with a longitudinal central axis of the conveyor. The present invention is characterized in that, in a plan view of the apparatus, the intersection points of the directions of the light bundles emitted from the light emitters on a same side of the conveyor with the longitudinal central axis of the conveyor differ from each other.

The light emitters of each set of light emitters may each comprise a plurality of light sources positioned in a pattern comprising a number of rows and columns and configured to emit directed light bundles into the irradiation volume through which the product is being transported on the conveyor. The plurality of light sources per light emitter may extend in a direction perpendicular to the conveyor or the trajectory of the product placed on the conveyor. Specifically, if it is assumed that the conveyor extends horizontally and the trajectory of the product placed on the conveyor is in the horizontal direction, the plurality of light emitters per set of light emitter may extend vertically, i.e. the plurality of light sources per set of light emitters may be positioned in a pattern of horizontal rows and vertical columns. Thus, the product can be irradiated extensively and uniformly. The arrangement of the two sets of light emitters opposite each other on both sides of the conveyor encompasses or defines the irradiation volume centered between the opposite sets of light emitters through which the conveyor passes and in which the product placed on the conveyor is irradiated.

The directed light bundle emitted by each light emitter or each light source of a respective light emitter into the irradiation volume is formed of a plurality of single light beams. Each light bundle has a specific irradiation direction, i.e. orientation, and may be a parallel or a divergent light bundle. In case of a parallel light bundle, in a plan view of the apparatus, the light bundle formed of a plurality of light beams has the form of a rectangle and the irradiation direction corresponds to a centerline of the rectangle. In case of a divergent, in particular conical, light bundle, in a plan view of the apparatus, the light bundle substantially has the form of a triangle and the irradiation direction corresponds to an angle bisector of the triangle.

According to the present invention, in a plan view of the apparatus, the intersection points of the directions of the light bundles emitted from the light emitters on a same side of the conveyor with the longitudinal central axis of the conveyor differ from each other. That is, the intersection points of the directions of the light bundles emitted from the light emitters on a same side of the conveyor with the longitudinal central axis of the conveyor are offset from each other along the longitudinal direction of the conveyor and, thus, along the trajectory of the product being transported by the conveyor through the irradiation volume. In other words, in a plan view of the apparatus, the light emitters of one set of light emitters are directed at different portions of the conveyor belt, wherein the directions of the light bundles differ from each other. With such a configuration, the sleeve-like labels on the products can be irradiated uniformly from all sides while being transported on the conveyor through the irradiation volume without the need to rotate the product on the conveyor. Due to the specific arrangement of light emitters and irradiation directions of the light bundles, respectively, light beams of the light bundles emitted by the light emitters can impinge the sleeve surface in a perpendicular direction at a plurality of positions around the circumference of the sleeve-like label while the product is transported on the conveyor through the irradiation volume. Thus, a uniform light irradiation on the sleeve surface can be achieved during the exposure period of the product inside the irradiation volume which results in a uniform temperature increase of the label. Thereby, a uniform shrinking effect of the label on the product can be achieved.

The two sets of light emitters may be symmetrically arranged with respect to the conveyor. In such a preferred embodiment, the central longitudinal axis of the conveyor corresponds to the symmetrical axis of the apparatus. This configuration further contributes to a uniform irradiation and temperature increase of the sleeve-like label during the exposure period of the product inside the irradiation volume. However, a non-symmetrical arrangement of the two sets of light emitters is also conceivable.

In a plan view of the apparatus, the irradiation volume may have an oval, in particular elliptical, shape. In other words, in a plan view of the apparatus, the light emitters may lie on an oval, in particular elliptical, curve. It is to be noted that the elliptical shape shall also include a substantially elliptical shape. With such a configuration, an even more uniform irradiation and temperature increase of the sleeve-like label during the exposure period can be achieved. Specially, an oval, in particular elliptical shape improves the temperature distribution in the sleeve-like label around the circumference of the product as the product can be irradiated evenly from all sides while being transported through the irradiation volume.

The two sets of light emitters may include a same number of, in particular four, light emitters.

The apparatus may comprise a plurality of side reflectors forming side boundaries of the irradiation volume for reflecting light emitted by the light emitters into the irradiation volume, wherein the light emitters and side reflectors are alternately arranged per set of light emitters. The side reflectors further improve a uniform irradiation of the product inside the irradiation volume by reflecting the light emitted by the light emitters. In particular, the side reflectors help to ensure that the product is irradiated evenly from all sides of the product so that the temperature of the sleeve-like label along its circumference can be increased uniformly during the exposure period. Thus, good shrink results can be achieved.

The apparatus may further comprise a top reflector and/or a bottom reflector arranged so as to constitute a top boundary and/or a bottom boundary of the irradiation volume, respectively, for reflecting light emitted by the light emitters into the irradiation volume. Products, in particular bottle-like containers, often have a curved top portion and a curved bottom portion. By using a top reflector and a bottom reflector, light emitted by the light emitters is reflected onto the curved top portion and the curved bottom portion of the product, respectively, and a homogenous temperature profile along the vertical axis of the sleeve material can be obtained. In other words, high temperatures required to shrink the sleeve-like label reliably onto the curved portions of the product and thus good shrink results can be achieved.

The reflectors may be flat. Although flat reflectors are used in the preferred embodiment due to the easy availability and low costs, curved reflector are also conceivable.

The reflectors may be made of any light-reflecting material. For example, the reflectors may be made of metal, specifically of aluminum sheet metal or aluminum foil. The reflectors may also be made of steel, in particular of stainless steel.

The apparatus may comprise a controller configured to control the light emitters to emit light bundles so as to irradiate the shrinkable label arranged on the product in the irradiation volume. As will be explained below, depending on the type of light emitter, the controller may be configured to selectively control the light emitters to continuously or discontinuously irradiate the shrinkable label while the product is conveyed through the irradiation volume. In case the light emitters comprise each a plurality of light sources, the said selective control of the light emitters may cover a selective control of the light emitters as such as well as a selective control of individual light sources of each light emitter.

Selectively controlling the light emitters permits a sequential activation of light emitters in accordance with a temporary position of the product moving through the irradiation volume, in such a way that the light beams of the sequentially activated light emitters follow the product moving through the irradiation volume. In other words, depending on the temporary position of the product moving through the irradiation volume, a sequential activation of only those light emitters whose emitted light beams meet a temporary position of the product moving through the irradiation volume, permits to reduce a heat emission into the irradiation volume by not-activating those light emitters whose light beams would not meet the temporary position of the product moving through the irradiation volume.

The light emitters may be UV light emitters, in particular LEDs. In a preferred embodiment, the light emitters are UV LEDs. By using UV LEDs, heat is generated inside of the sleeve-like label instead of being applied from the outside because the label material or ink or varnish included in the label material is able to absorb the UV light and convert the absorbed UV light into thermal energy. When using UV light emitters as light emitters, both a continuous and discontinuous irradiation of the shrinkable label is possible.

The light emitters may be mercury lamps or halogen lamps. Such lamps emit polychromatic light instead of monochromatic light. Further, such lamps possess a higher efficiency and higher robustness in comparison to LED light emitters. The output power of mercury lamps and halogen lamps is very high and they are cheaper compared to LED light emitters. However, when using mercury lamps or halogen lamps, only a continuous irradiation of the shrinkable label is possible while the product is conveyed through the irradiation volume.

As a further alternative, the light emitters may be IR lamps. IR lamps are common as high power lamps and cheaper in comparison to UV light emitters.

The conveyor may be part of the apparatus. In this case, a length of the conveyor may be equal to or (slightly) greater than a length of the apparatus along the trajectory of the conveyor inside the apparatus. In this way, the apparatus comprising the conveyor can easily be integrated into an already existing production line by interposing the conveyor of the apparatus into a regular conveyor of the production line. Further, as the length of the conveyor of the apparatus is preferably limited to the length of the apparatus, as described below, a material and/or coating having special properties can be used for the conveyor without increasing costs excessively.

In particular, the conveyor or at least a conveyor belt supporting the product may be made of a material that is able to withstand high temperatures generated by the light emitters inside the irradiation volume of the apparatus. This can prevent the conveyor or conveyor belt from partially melting and being damaged. For example, the conveyor may be made of stainless steel. Specifically, the conveyor belt may be configured from a plurality of plates successively arranged along the trajectory of the conveyor and supporting the product moving through the irradiation volume. In this case it may be sufficient if the conveyor plates are made of a material or are coated with a material that is able to withstand the high temperatures generated by the light emitters inside the irradiation volume of the apparatus. For example, the conveyor plates are made from steel, specifically stainless steel.

Further, the conveyor belt may be made from a light-reflecting material or have a light-reflecting coating. Thus, similar to the bottom reflector of the apparatus, light emitted by the light emitters can be reflected by the conveyor onto the curved bottom portion of the product, and homogeneity of the temperature profile along the vertical axis of the sleeve material can be further improved. In other words, high temperatures required to shrink the sleeve-like label reliably onto the curved bottom portion of the product and thus good shrink results can be achieved. For example, as above mentioned, the conveyor plates are made from steel, specifically stainless steel.

A first method of attaching a shrinkable label placed on a product, to the product using an apparatus according to the present invention including a controller comprises the steps: transporting the product on the conveyor through the irradiation volume; and controlling the light emitters to continuously emit light bundles while the product is being transported on the conveyor through the irradiation volume.

According to the first method of the present invention, the sleeve-like label placed on the product starts to get exposed to the light emitted by the light emitters when the product enters the irradiation volume and the exposure ends when the product placed on the conveyor leaves the irradiation volume. The first method will also be referred to as continuous mode.

In the first method, the light emitters may be controlled so as to output at a relative power of 65%. The inventors have found that in the continuous mode, a relative output power of 65% of the UV light emitters provides good shrink results.

A second method of attaching a shrinkable label placed on a product, to the product using an apparatus according to the present invention including UV LEDs as light emitters and a controller, comprising the steps transporting the product on the conveyor through the irradiation volume; and controlling the light emitters to discontinuously emit light bundles while the product is being transported on the conveyor through the irradiation volume.

According to the second method of the present invention, the sleeve-like label placed on the product is only temporarily irradiated with light emitted by the light emitters while the product is being transported on the conveyor through the irradiation volume. For example, if the two sets of light emitters include four light emitters each, the light emitters may be controlled to emit light onto the product only while the product is approximately between the two middle light emitters. The second method will also be referred to as pulsed mode.

In the second method, the light emitters may be controlled so as to output at a relative power of 60% to 100%. The inventors have found that in the pulsed mode, a relative output power of 60% to 100% of the UV LED emitters provides the best shrink results.

SHORT DESCRIPTION OF THE FIGURES

A preferred embodiment is described in more detail in the following with the help of the appended figures, wherein.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it should be understood, however, that this invention is not limited to the precise arrangements shown.

DETAILED DESCRIPTION OF A PREFERRED EMBODIMENT

The following description of a preferred embodiment of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive. Various suitable ways in which the teachings herein may be combined will be readily apparent to those of ordinary skill in the art in view of the teachings herein. Such modifications and variations are intended to be included within the scope of the claims.

Preferred Embodiment

Figure 1:
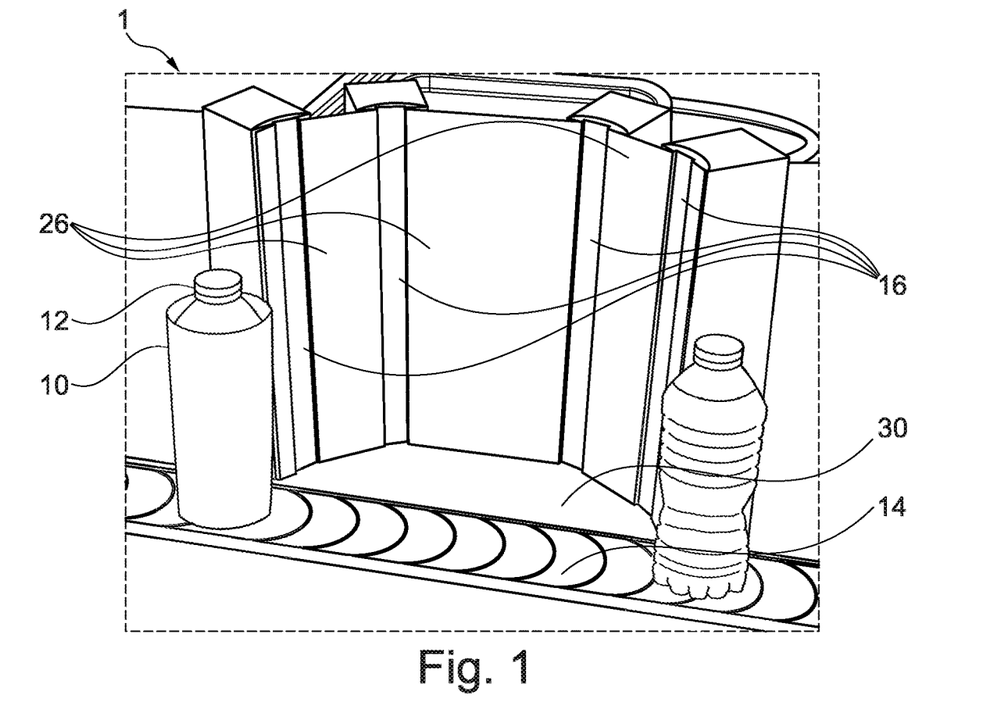
FIG. 1 shows a perspective view of an apparatus of a preferred embodiment according to the invention.
Figure 3:
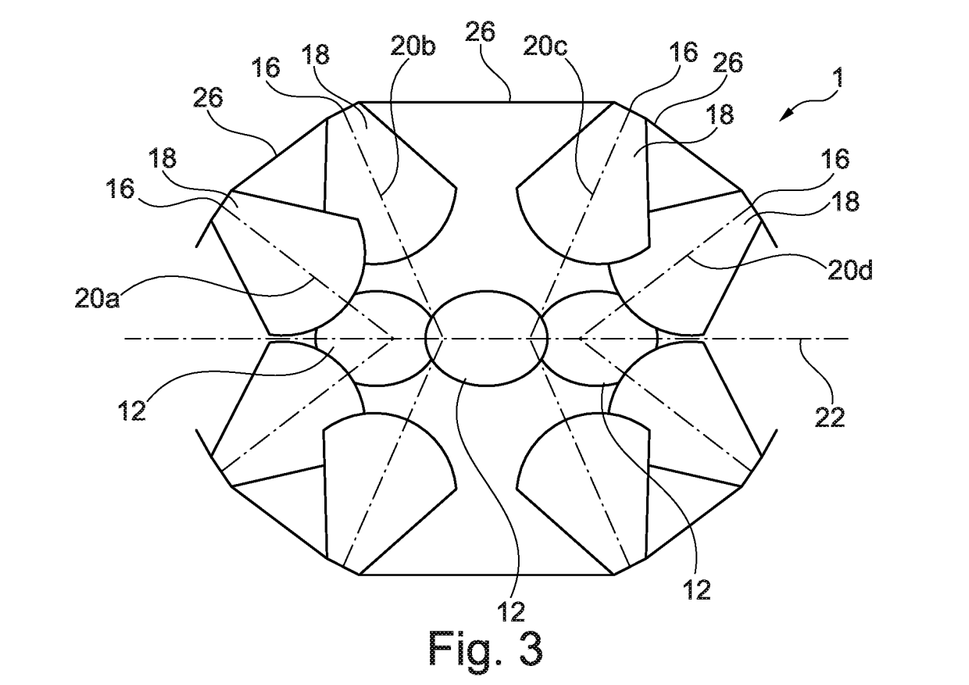
FIG. 3 shows a plan view of the apparatus of the preferred embodiment according to the invention illustrating directed light bundles emitted by light emitters.
Figure 4:
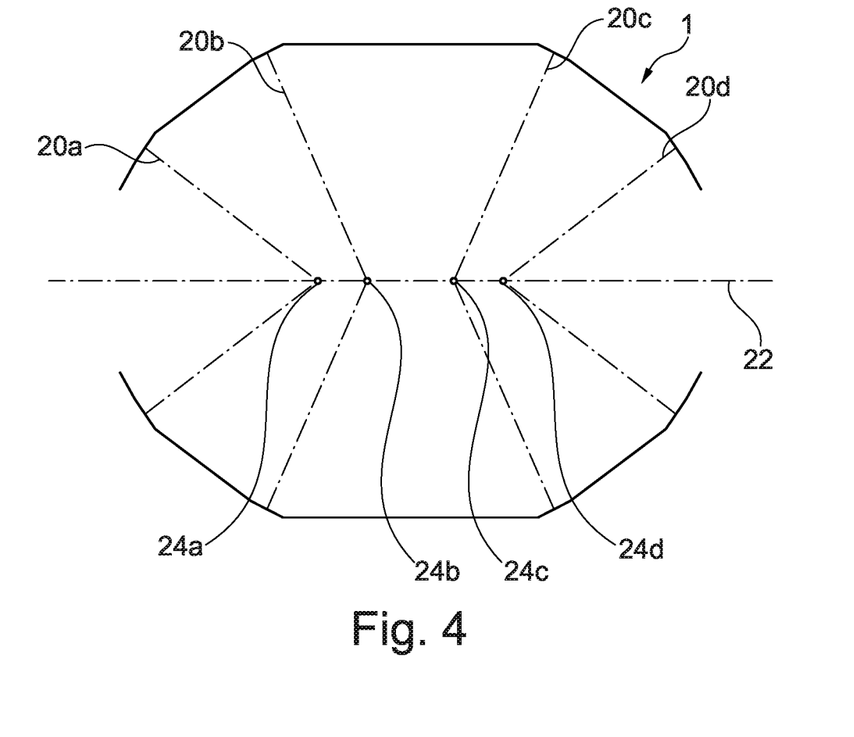
FIG. 4 shows a plan view of the apparatus of the preferred embodiment according to the invention illustrating irradiation directions of the light bundles of FIG. 3.

FIGS. 1, 3 and 4 show views of an apparatus of a preferred embodiment according to the invention.

Figure 10:
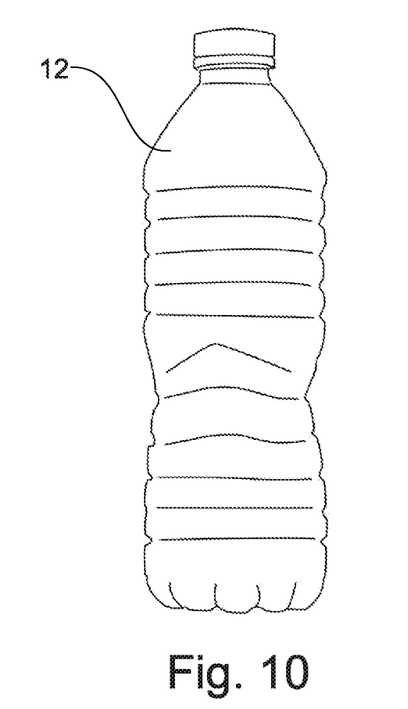
FIG. 10 shows a front view of a product in the form of a bottle.

Referring to FIGS. 1, 3 and 4, an apparatus 1 is shown for attaching a sleeve-like shrinkable label 10 on a product 12 in the form of a bottle. Specifically, the bottle has a shape as shown in FIG. 10. The product 12 is placed on a conveyor 14 that transports the product 12 and the label 10 put loosely over the product 12 into and through an irradiation volume that is defined by two sets of light emitters 16 which are arranged opposite each other on both sides of the conveyor 14. It is to be noted that FIG. 1 only shows one of the two sets of light emitters 16. The sleeve-like label 10 is made of heat-shrinkable material that is caused to shrink when its temperature is increased by irradiation of the light emitters 16 and thereby getting firmly attached to the product 12.

In the preferred embodiment, the two sets of light emitters 16 are symmetrically arranged with respect to the conveyor 14. As shown in the plan view of the apparatus 1 in FIG. 3, the central longitudinal axis 22 of the conveyor 14 corresponds to the symmetrical axis of the apparatus 1. It is to be noted that the three products 12 shown in FIG. 3 picture one and the same product 12 at three different times. The arrangement of the two sets of light emitters 16 opposite each other on both sides of the conveyor 14 encompasses the irradiation volume centered between the opposite sets of light emitters 16 through which the conveyor 14 passes and in which the product 12 placed on the conveyor 14 is irradiated by the light emitters 16. In the preferred embodiment, each set of light emitters 16 includes four light emitters 16.

As shown in the plan views of the apparatus 1 in FIGS. 3 and 4, the irradiation volume defined by the arrangement of the two sets of light emitters 16 has a substantially elliptical shape. In other words, in the plan view of the apparatus 1, the light emitters 16 lie on a substantially elliptical curve. With such a configuration, a uniform irradiation and temperature increase of the sleeve-like label 10 during the exposure period can be achieved. Specially, the substantially elliptical shape improves the temperature distribution in the sleeve-like label 10 around the circumference of the product 12 as the product 12 can be irradiated evenly from all sides while being transported through the irradiation volume.

The light emitters 16 each comprise a plurality of light sources in the form of UV LEDs positioned in a pattern (not shown in detail in the drawings) and configured to emit directed light bundles 18 into the irradiation volume through which the product 12 is being transported on the conveyor 14. The plurality of light sources per light emitter 16 extend in a direction vertically to the conveyor 14 or the trajectory of the product 12 placed on the conveyor 14 that passes horizontally through the irradiation volume. Thus, the sleeve-like label 10 on the product 12 can be irradiated over its entire vertical height extensively and uniformly. By using UV LEDs, heat is generated inside of the sleeve-like label 10 instead of being applied from the outside because the label material is able to absorb the UV light and convert the absorbed UV light into thermal energy.

The directed light bundle 18 emitted by each UV LED of a respective light emitter 16 into the irradiation volume is formed of light beams 32. As shown in FIG. 3, each light bundle 18 has a specific irradiation direction 20a-20d (only irradiation directions of the light bundles 18 of one set of light emitters 16 are provided with reference signs), i.e. orientation. The light bundles 18 are conical divergent light bundles 18, wherein in the plan view of FIG. 3, each light bundle 18 substantially has the form of a triangle and the irradiation direction 20a-20d corresponds to an angle bisector of the triangle. It is to be noted that, only for the reasons of clarity, the light bundles 18 shown in the drawings are limited by a circular arc in their respective irradiation directions 20a-20d.

Figure 8:
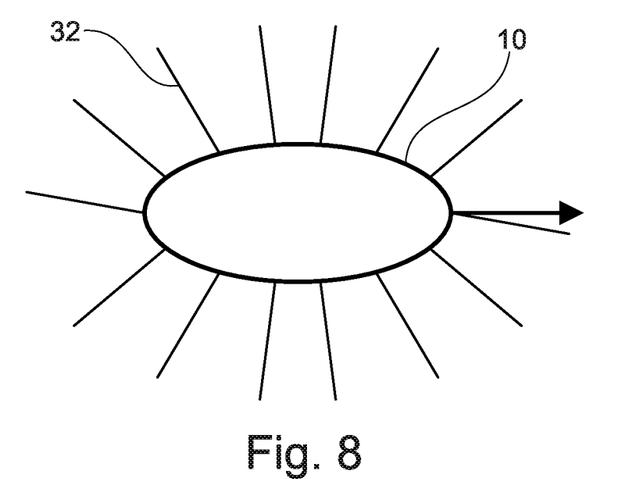
FIG. 8 shows a label surface being perpendicularly irradiated by light beams.

As shown in FIGS. 3 and 4, intersection points 24a-24d of the directions 20a-20d of the light bundles 18 emitted from the light emitters 16 on a same side of the conveyor 14 with the longitudinal central axis 22 of the conveyor 14 differ from each other. That is, the intersection points 24a-24d of the directions 20a-20d of the light bundles 18 emitted from the light emitters 16 on a same side of the conveyor 14 with the longitudinal central axis 22 of the conveyor 14 are offset from each other along the longitudinal direction of the conveyor 14 and, thus, along the trajectory of the product 12 being transported by the conveyor 14 through the irradiation volume. In other words, in the plan view of the apparatus 1 of FIGS. 3 and 4, the light emitters 16 of one set of light emitters 16 are directed at different portions of the conveyor belt, wherein the directions 20a-20d of the light bundles 18 differ from each other. With such a configuration, the sleeve-like labels 10 on the products 12 can be irradiated uniformly from all sides while being transported on the conveyor 14 through the irradiation volume without the need to rotate the product on the conveyor 14. Due to the specific arrangement of light emitters 16 and irradiation directions 20a-20d of the light bundles 18, respectively, light beams 32 of the light bundles 18 emitted by the light emitters 16 can impinge the sleeve surface in a perpendicular direction at a plurality of positions around the circumference of the sleeve-like label 10 (see FIG. 8) while the product 12 is transported on the conveyor 14 through the irradiation volume. Thus, a uniform light irradiation on the sleeve surface can be achieved during the exposure period of the product 12 inside the irradiation volume which results in a uniform temperature increase of the label. Thereby, a uniform shrinking effect of the label 10 on the product 12 can be achieved.

As shown in FIGS. 1, 3 and 4 of the preferred embodiment, the apparatus 1 comprises flat side reflectors 26 made of aluminum sheet metal forming side boundaries of the irradiation volume for reflecting light emitted by the light emitters 16 into the irradiation volume. The light emitters 16 and side reflectors 26 are alternately arranged per set of light emitters 16. The side reflectors 26 further improve a uniform irradiation of the product 12 inside the irradiation volume by reflecting the light emitted by the light emitters 16. In particular, the side reflectors 26 help to ensure that the product 12 is irradiated evenly from all sides of the product 12 (see FIG. 8) so that the temperature of the sleeve-like label 10 along its circumference can be increased uniformly during the exposure period.

Figure 9:
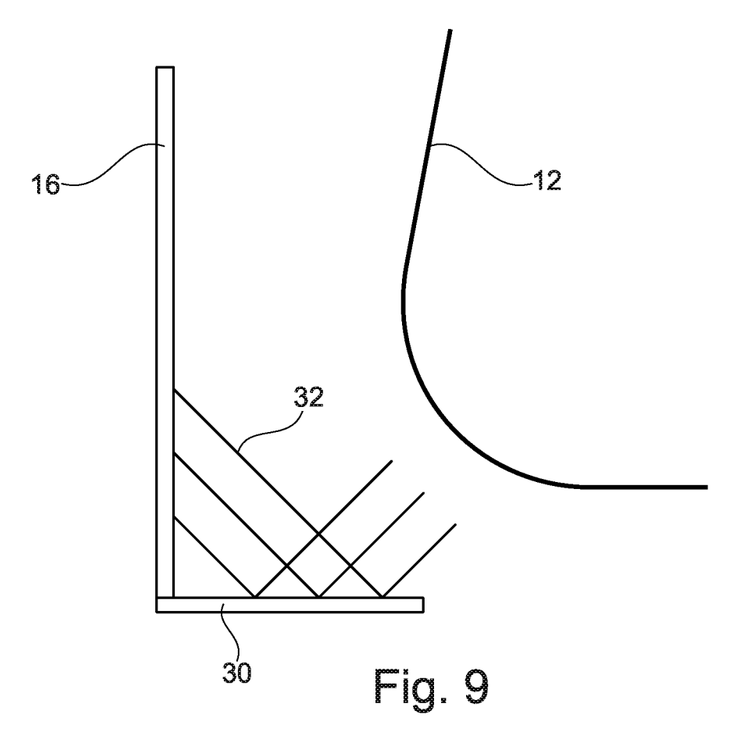
FIG. 9 shows a bottom portion of a product being irradiated by light beams.

The apparatus 1 according to the preferred embodiment further comprises a top reflector 28 and a bottom reflector 30 arranged so as to constitute a top boundary and a bottom boundary of the irradiation volume, respectively, for reflecting light emitted by the light emitters 16 into the irradiation volume. Products, in particular bottle-like containers, often have a curved top portion and a curved bottom portion. As shown in FIG. 9, by using the top reflector 28 and the bottom reflector 30, light beams 32 of the light bundles 18 emitted by the light emitters 16 are reflected onto the curved top portion and the curved bottom portion of the product 12 or the label 12, respectively. Accordingly, a homogenous temperature profile along the vertical axis of the sleeve material can be obtained. In other words, high temperatures required to shrink the sleeve-like label 10 reliably onto the curved portions of the product 12 and thus good shrink results can be achieved.

Method

In the following, a preferred method for attaching a shrinkable label placed on a product, to the product using the apparatus according to the preferred embodiment is described. This method will also be referred to as pulsed mode. Although not shown in the drawings, the apparatus 1 comprises a controller configured to control the light emitters 16 to emit light bundles 18 so as to irradiate the shrinkable label 10 arranged on the product 12 in the irradiation volume.

According to the method, as shown in FIG. 1, the shrinkable label 10 placed on the product 12 is transported on the conveyor 14 through the irradiation volume of the apparatus 1. The light emitters 16 in the form of UV LEDs are controlled to discontinuously emit light bundles 18 while the product 12 is being transported on the conveyor 14 through the irradiation volume. Thus, the sleeve-like label 10 placed on the product 12 is only temporarily irradiated with light emitted by the light emitters 16 while the product 12 is being transported on the conveyor 14 through the irradiation volume. In the preferred embodiment, the two sets of light emitters 16 include four light emitters 16 each. In the pulsed mode, the light emitters 16 are controlled to emit light onto the product 12 only while the product 12 is approximately between the two middle light emitters 16. In other words, as shown in FIG. 3, the light emitters 16 start to emit directed light bundles 18 onto the product when the product 12 placed on the conveyor 14 has reached the left-most position of the three illustrated product positions, i.e. the intersection point 24a shown in FIG. 4. Further, the light emitters 16 stop to emit directed light bundles 18 onto the product when the product 12 placed on the conveyor 14 has reached the right-most position of the three illustrated product positions, i.e. the intersection point 24d shown in FIG. 4.

Further Embodiments

In the preferred embodiment, the two sets of light emitters are symmetrically arranged with respect to the conveyor. However, a non-symmetrical arrangement of the two sets of light emitters is also conceivable.

Figure 2:
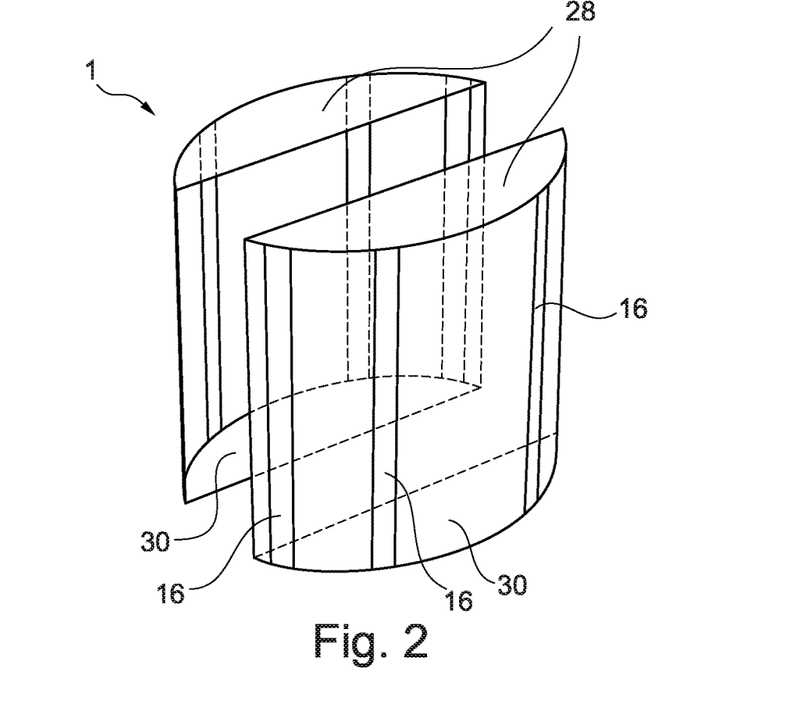
FIG. 2 shows a perspective view of an apparatus according to the invention illustrating a top reflector and a bottom reflector.
Figure 5:
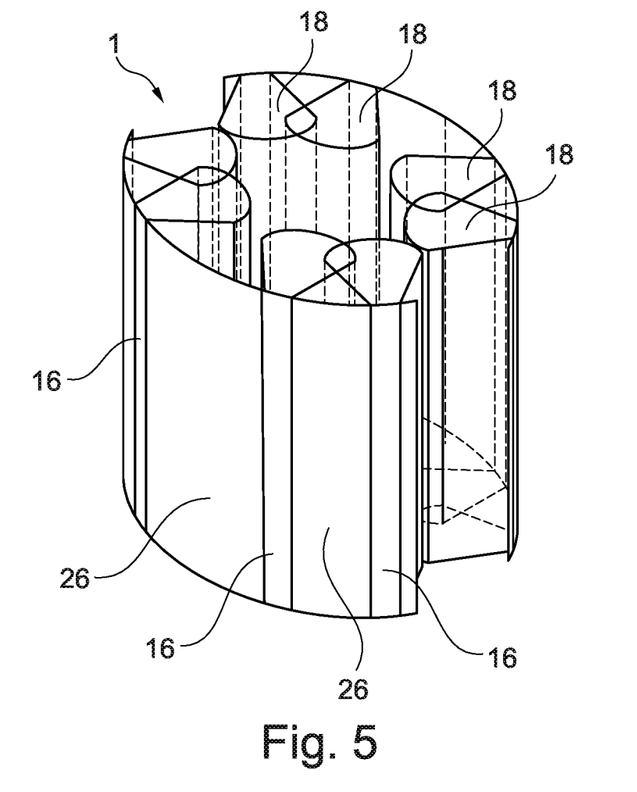
FIG. 5 shows a perspective view of an apparatus having curved side reflectors according to the invention.

In the preferred embodiment, the reflectors are flat. However, curved reflectors as shown in FIGS. 2, 5 and 6 are also conceivable.

In the preferred embodiment, the light emitters are UV LEDs. However, the light emitters 16 may be mercury lamps or halogen lamps. Such lamps emit polychromatic light instead of monochromatic light. Further, such lamps possess a higher efficiency and higher robustness in comparison to LED light emitters. The output power of mercury lamps and halogen lamps is very high and they are cheaper compared to LED light emitters.

As a further alternative, the light emitters may be IR lamps. IR lamps are common as high power lamps and cheaper in comparison to UV light emitters.

As described above, according to the preferred method, the light emitters are controlled to discontinuously emit light bundles while the product is being transported on the conveyor through the irradiation volume. Specifically, the light emitters are controlled to emit light onto the product only while the product is approximately between the two middle of the four light emitters of each set of light emitters. However, depending on the form of the product, the irradiation pulse of the light emitters may also start earlier or later and may end earlier or later.

Further, according to another method which will also be referred to as continuous mode, the controller may be configured to control the light emitters to continuously irradiate the shrinkable label while the product is conveyed through the irradiation volume. According to the continuous mode, the sleeve-like label placed on the product starts to get exposed to the light emitted by the light emitters when the product enters the irradiation volume and the exposure ends when the product placed on the conveyor leaves the irradiation volume.

REFERENCE SIGNS 1 apparatus
10 label
12 product
14 conveyor
16 light emitter
18 light bundle
20a-20d direction
22 longitudinal central axis
24a-24d intersection point
26 side reflector
28 top reflector
30 bottom reflector
32 light beam

The invention claimed is:

1. Apparatus for attaching a shrinkable label on a product placed on a conveyor, by irradiating light onto the shrinkable label, the apparatus comprising two sets of light emitters which are arranged opposite each other on both sides of the conveyor along a defined length of the conveyor to form an irradiation volume through which the conveyor passes, wherein the light emitters are configured to emit directed light bundles into the irradiation volume in different directions, and wherein in a plan view of the apparatus, the directions of the light bundles intersect with a longitudinal central axis of the conveyor, characterized in that in a plan view of the apparatus, the intersection points of the directions of the light bundles emitted from the light emitters on a same side of the conveyor with the longitudinal central axis of the conveyor differ from each other, the apparatus further comprising a plurality of side reflectors forming side boundaries of the irradiation volume for reflecting light emitted by the light emitters into the irradiation volume, wherein the light emitters and side reflectors are alternately arranged per set of light emitters.

2. Apparatus according to claim 1, wherein the two sets of light emitters are symmetrically arranged with respect to the conveyor.

3. Apparatus according to claim 2, wherein in a plan view of the apparatus the irradiation volume has an oval shape.

4. Apparatus according to claim 2, wherein the two sets of light emitters include a same number of light emitters.

5. Apparatus according to claim 1, further comprising a top reflector—and/or a bottom reflector arranged so as to constitute a top boundary and/or a bottom boundary of the irradiation volume, respectively, for reflecting light emitted by the light emitters into the irradiation volume.

6. Apparatus according to claim 5, wherein the reflectors are flat.

7. Apparatus according to claim 5, wherein the reflectors are made of aluminum sheet metal or aluminum foil.

8. Apparatus according to claim 1, further comprising a controller configured to control the light emitters to emit light bundles so as to irradiate the shrinkable label arranged on the product in the irradiation volume.

9. Apparatus according to claim 8, wherein the light emitters are mercury lamps, halogen lamps or IR lamps.

10. Apparatus according to claim 1, wherein in a plan view of the apparatus the irradiation volume has an oval, shape.

11. Apparatus according to claim 1, wherein the two sets of light emitters include a same number of light emitters.

12. Apparatus according to claim 1, wherein the reflectors are flat.

13. Apparatus according to claim 1, wherein the reflectors are made of aluminum sheet metal or aluminum foil.

14. Apparatus for attaching a shrinkable label on a product placed on a conveyor, by irradiating light onto the shrinkable label, the apparatus comprising two sets of light emitters which are arranged opposite each other on both sides of the conveyor along a defined length of the conveyor to form an irradiation volume through which the conveyor passes, wherein the light emitters are configured to emit directed light bundles into the irradiation volume in different directions, and wherein in a plan view of the apparatus, the directions of the light bundles intersect with a longitudinal central axis of the conveyor, characterized in that
  in a plan view of the apparatus, the intersection points of the directions of the light bundles emitted from the light emitters on a same side of the conveyor with the longitudinal central axis of the conveyor differ from each other,
the apparatus further comprising a controller configured to control the light emitters to emit light bundles so as to irradiate the shrinkable label arranged on the product in the irradiation volume, wherein the light emitters are UV light emitters.

15. Method of attaching a shrinkable label placed on a product, to the product using an apparatus according to claim 14, comprising the steps:
  transporting the product on the conveyor through the irradiation volume; and
  controlling the light emitters to continuously emit light bundles while the product is being transported on the conveyor through the irradiation volume.

16. Method according to claim 15, wherein the light emitters are controlled so as to output at a relative power of 65%.

17. Method of attaching a shrinkable label placed on a product, to the product using an apparatus according to claim 14, wherein the light emitters are LEDs, comprising the steps:
  transporting the product on the conveyor through the irradiation volume; and
  controlling the light emitters to discontinuously emit light bundles while the product is being transported on the conveyor through the irradiation volume.

18. Method according to claim 17, wherein the light emitters are controlled so as to output at a relative power of 60% to 100%.

* * * * *